(No Model.)

W. P. KOOKOGEY.
SECONDARY BATTERY PLATE.

No. 422,533. Patented Mar. 4, 1890.

Witnesses:
D. W. Gardner
Walter S. Logan
Arthur E. Wahradt

Inventor:
William P. Kookogey
by Salter S. Clark
his atty

UNITED STATES PATENT OFFICE.

WILLIAM P. KOOKOGEY, OF BROOKLYN, NEW YORK, ASSIGNOR TO THE KOOKOGEY ELECTRIC COMPANY.

SECONDARY-BATTERY PLATE.

SPECIFICATION forming part of Letters Patent No. 422,533, dated March 4, 1890.

Application filed September 26, 1889. Serial No. 325,210. (No model.)

*To all whom it may concern:*

Be it known that I, WILLIAM P. KOOKOGEY, of the city of Brooklyn, county of Kings, and State of New York, have invented a new and useful Storage-Battery Plate, of which the following is a specification.

My invention is a new plate for secondary batteries; and it consists, in general, of a pocket or envelope of thin sheet-lead containing active material, and having its walls pierced or perforated to allow of circulation.

Figure 1:
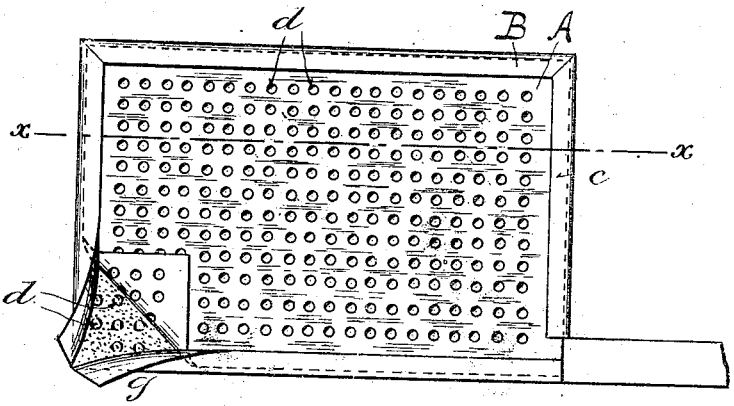
Figure 2:
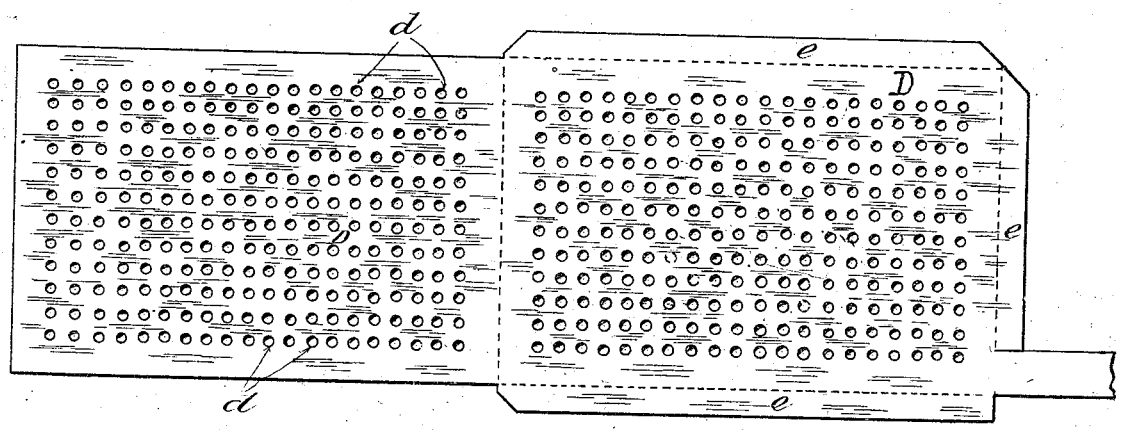
Figure 3:

In the accompanying drawings, Figure 1 is a view of such plate made out of two sheets by simply turning the edges of one sheet over the other. Fig. 2 is a view of a single sheet of lead perforated and of the form to make a pocket-plate by folding one part over the other. Fig. 3 is a sectional view on the line $x\ x$ of Fig. 1.

A and B are sheets of lead-foil or other comparatively thin sheet-lead, B being somewhat larger than A, and having its edges turned over the edges of A, as at $c$.

In Fig. 2, D is a single sheet made to fold, one part over the other, and having flaps $e$ upon one part, which are to be folded over the edges of the other half. Each of the containing-walls of the pocket has perforations $d$, through which the electrolyte gains access to the interior of the pocket. Within the pocket is placed the active material, or rather the material to become active, which may be an oxide of lead, metallic lead, scraps of lead, other sheets of sheet-lead, or any form of lead, as most desirable. This is shown by dots in Fig. 1 at $g$, where one of the corners is turned back.

The essential idea of this invention is the making of a plate in the form of a pocket, within which the active material may lie and be held in the form of a paste or powder, or whatever form, without any danger of disintegration or any injury to the plate in the action of the battery, the containing-walls of lead acting with the active material to increase its efficiency, and at the same time always giving sufficient solidity to the plate, so that it retains its form. Any method of uniting the edges of the containing-walls may be used besides that of folding one over the other—such, for instance, as soldering or clamping them together, the sheets being then made of the same size. Any form of perforation may be used. A particularly useful one is that shown in an application for a secondary-battery plate filed simultaneously herewith, Serial No. 325,209, consisting of a large number of minute punctures made by a sharp instrument.

I claim as my invention—

A plate for secondary batteries, consisting of a pocket or envelope of sheet-lead, perforated to allow of circulation, having its edges closed by folding the edges of one side or sheet of the plate over the edges of the other side or sheet, and containing active material or material to become active, substantially as described.

In witness whereof I hereunto set my hand, this 24th day of September, 1889, in the presence of two witnesses.

WM. P. KOOKOGEY.

Witnesses:
ARTHUR E. WALRADT,
SALTER STORRS CLARK.